United States Patent
Walia et al.

(10) Patent No.: US 10,477,937 B2
(45) Date of Patent: *Nov. 19, 2019

(54) SYSTEMS AND APPARATUSES TO APPLY A MATERIAL TO A NAIL

(71) Applicant: PREEMADONNA INC., Redmond, WA (US)

(72) Inventors: Herpreet Walia, Menlo, CA (US);
Casey Schulz, San Jose, CA (US);
Janet Peterson, Larkspur, CA (US);
Peter Peterson, Larkspur, CA (US)

(73) Assignee: PREEMADONNA INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,238

(22) Filed: May 14, 2018

(65) Prior Publication Data

US 2018/0255902 A1    Sep. 13, 2018

Related U.S. Application Data

(63) Continuation of application No. 15/599,503, filed on May 19, 2017, which is a continuation of application
(Continued)

(51) Int. Cl.
*A45D 7/00* (2006.01)
*A45D 29/22* (2006.01)
(Continued)

(52) U.S. Cl.
CPC .............. *A45D 29/22* (2013.01); *A45D 29/00* (2013.01); *A45D 34/042* (2013.01);
(Continued)

(58) Field of Classification Search
CPC .. A45D 29/00; A45D 29/22; A45D 2029/005; A45D 44/005; A45D 2044/007;
(Continued)

(56) References Cited

U.S. PATENT DOCUMENTS

| 3,130,734 A | 4/1964 | Ellis et al. |
| D277,323 S | 1/1985 | Raicevic |

(Continued)

FOREIGN PATENT DOCUMENTS

| AU | 2014304383 | 11/2015 |
| CA | 2911150 | 2/2015 |

(Continued)

OTHER PUBLICATIONS

International Search Report & Written Opinion for Application No. PCT/US2015/027851, Date of filing: Apr. 17, 2015, Applicant: Preemadonna Inc. dated Oct. 28, 2015.
(Continued)

*Primary Examiner* — Rachel R Steitz
(74) *Attorney, Agent, or Firm* — London Bridge Ventures

(57) ABSTRACT

Systems and apparatuses to apply a material to a nail are herein disclosed. In one aspect, embodiments of the present disclosure include apparatus having a receiving unit adapted to receive or hold an external device, an applicator unit to apply the material to the nail, and/or a position aiding unit operably coupled to the applicator unit. In operation, the position aiding unit facilitates positioning of the nail relative to the applicator unit and the applicator unit applies the material to the nail. In one embodiment, the apparatus further includes an imaging unit to capture an image of the nail and external device includes a mobile phone. The imaging unit can include a back-facing camera of the mobile phone.

17 Claims, 13 Drawing Sheets

Related U.S. Application Data

No. 14/468,239, filed on Aug. 25, 2014, now Pat. No. 9,687,059.

(60) Provisional application No. 61/869,611, filed on Aug. 23, 2013, provisional application No. 62/028,233, filed on Jul. 23, 2014.

(51) Int. Cl.
| | |
|---|---|
| A45D 29/00 | (2006.01) |
| A45D 44/00 | (2006.01) |
| G06T 7/13 | (2017.01) |
| B41J 3/407 | (2006.01) |
| A45D 34/04 | (2006.01) |
| G06T 7/20 | (2017.01) |
| G06T 7/70 | (2017.01) |

(52) U.S. Cl.
CPC ............ *A45D 44/005* (2013.01); *B41J 3/407* (2013.01); *B41J 3/4073* (2013.01); *G06T 7/13* (2017.01); *G06T 7/20* (2013.01); *G06T 7/70* (2017.01); *A45D 2029/005* (2013.01); *A45D 2044/007* (2013.01); *G06T 2207/30196* (2013.01)

(58) Field of Classification Search
CPC .... G06T 7/13; G06T 7/70; G06T 7/20; G06T 2207/30196; B41J 3/407; B41J 3/4073
See application file for complete search history.

(56) References Cited

U.S. PATENT DOCUMENTS

| | | | |
|---|---|---|---|
| D299,559 | S | 1/1989 | Wong |
| 4,864,966 | A | 9/1989 | Anderson et al. |
| 4,910,661 | A | 3/1990 | Barth et al. |
| 5,668,930 | A | 9/1997 | Hamura et al. |
| 5,931,166 | A | 8/1999 | Weber |
| 6,067,996 | A | 5/2000 | Pearl |
| 6,286,517 | B1 | 9/2001 | Weber |
| 6,336,694 | B1 | 1/2002 | Ishizaka |
| D686,369 | S | 7/2013 | Horvath |
| D705,488 | S | 5/2014 | Cheng |
| 9,357,825 | B2 | 6/2016 | Yamasaki |
| 1,478,201 | A1 | 10/2016 | Legallais |
| 9,475,308 | B2 | 10/2016 | Legallais |
| 2003/0041871 | A1 | 3/2003 | Endo |
| 2003/0217758 | A1 | 11/2003 | Mesirow |
| 2004/0094176 | A1 | 5/2004 | Daoting |
| 2005/0041018 | A1 | 2/2005 | Philipp |
| 2005/0150508 | A1 | 7/2005 | Downs |
| 2006/0087686 | A1 | 4/2006 | Anderson |
| 2007/0050207 | A1 | 3/2007 | Merszei |
| 2012/0048880 | A1 | 3/2012 | Damolaris |
| 2012/0066079 | A1 | 3/2012 | Falzone |
| 2012/0103210 | A1* | 5/2012 | Hashimoto ............... B41J 3/407 101/35 |
| 2012/0147113 | A1 | 6/2012 | Yamasaki |
| 2012/0287183 | A1 | 11/2012 | Bitoh |
| 2012/0287192 | A1 | 11/2012 | Yamasaki |
| 2013/0019799 | A1 | 1/2013 | Bitoh |
| 2013/0038647 | A1 | 2/2013 | Hashimoto |
| 2013/0083098 | A1 | 4/2013 | Yamasaki |
| 2013/0216295 | A1 | 8/2013 | Wong |
| 2013/0235137 | A1 | 9/2013 | Nakayama |
| 2013/0274907 | A1 | 10/2013 | Carbonera et al. |
| 2014/0060560 | A1 | 3/2014 | Bitoh et al. |
| 2014/0132968 | A1 | 5/2014 | Bitoh et al. |
| 2014/0161507 | A1* | 6/2014 | Wong ..................... A45D 40/00 401/195 |
| 2015/0138385 | A1 | 5/2015 | Kim |
| 2015/0182001 | A1 | 7/2015 | Yi |
| 2015/0335131 | A1 | 11/2015 | Ortiz |
| 2016/0183657 | A1 | 6/2016 | Nagao |
| 2017/0036456 | A1 | 2/2017 | Legallais |
| 2017/0072702 | A1 | 3/2017 | Collett |
| 2017/0215550 | A1 | 8/2017 | Walia et al. |
| 2017/0347770 | A1 | 12/2017 | Walia et al. |
| 2018/0255902 | A1 | 9/2018 | Walia et al. |
| 2018/0255903 | A1 | 9/2018 | Walia et al. |

FOREIGN PATENT DOCUMENTS

| | | |
|---|---|---|
| CA | 2955640 | 1/2016 |
| CN | 102555529 | 7/2012 |
| CN | 102886983 | 1/2013 |
| CN | 102922880 | 2/2013 |
| CN | 102948994 | 3/2013 |
| CN | 201480021791.4 | 1/2016 |
| CN | 106998870 | 8/2017 |
| EP | 1204340 | 5/2002 |
| EP | 2740386 | 6/2014 |
| EP | 2991832 | 3/2016 |
| EP | 3179880 | 6/2017 |
| EP | 3222432 | 9/2017 |
| GB | 2546672 | 7/2017 |
| HK | 1240044 A | 5/2018 |
| JP | 2003-534083 A | 11/2003 |
| JP | 2002165632 | 1/2004 |
| JP | 2012085944 | 5/2012 |
| JP | 2013142881 | 7/2013 |
| JP | 2013192681 | 9/2013 |
| JP | 201464892 | 4/2014 |
| JP | 2014113445 | 6/2014 |
| JP | 2014171699 | 9/2014 |
| JP | 2016532710 | 9/2016 |
| JP | 2017521225 | 8/2017 |
| WO | WO99/33372 | 12/1998 |
| WO | WO0191598 | 12/2001 |
| WO | WO 2014091411 | 6/2014 |
| WO | WO2015018987 | 2/2015 |
| WO | WO201501696 | 7/2015 |
| WO | WO2015132734 | 9/2015 |
| WO | WO2016014132 | 1/2016 |

OTHER PUBLICATIONS

Google Internet search for 'nail printing machine' date restricted prior to Apr. 26, 2014, 4 pages.
GB Exam report GB Application No. 1706383.5, Applicant: Preemadonna Inc., dated Jan. 8, 2018, 4 pages.
GB Exam report GB Application No. 1706383.5, Applicant: Preemadonna Inc., dated Mar. 13, 2018, 2 pages.
GB Exam report GB Application No. 1706383.5, Applicant: Preemadonna Inc., dated Jul. 2, 2018, 3 pages.
GB Exam report GB Application No. 1706383.5, Applicant: Preemadonna Inc., dated Sep. 7, 2018, 3 pages.
GB Exam report GB Application No. 1814292.7, Applicant: Preemadonna Inc., dated Sep. 28, 2018, 2 pages.
GB Exam report GB Application No. 1814292.7, Applicant: Preemadonna Inc., dated Oct. 22, 2018, 5 pages.
GB Exam report GB Application No. 1814292.7, Applicant: Preemadonna Inc., dated Nov. 22, 2018, 4 pages.
GB Exam report GB Application No. 1814292.7, Applicant: Preemadonna Inc., dated Dec. 18, 2018, 2 pages.
EPO EESR and Search Opinion EP Application No. 15824530.8, Applicant: Preemadonna Inc., dated Oct. 4, 2018, 9 pages.
International Search Report & Written Opinion for Application No. PCT/US2018/054217, Date of filing: Oct. 3, 2018, Applicant: Preemadonna Inc. dated Feb. 11, 2019, 11 pages.
Lee, Hanna, On My mind: It is a Social Burden?, Jun. 13, 2012, NAILS Magazine (2013).
Translation of WO2015-018987 Retrieved from patent scope.
JP Exam report JP Application No. 2017-525507 Applicant: Preemadonna Inc., dated May 8, 2019, 8 pages.
CA Exam report CA Application No. 2955640 Applicant: Preemadonna Inc., dated Feb. 20, 2019, 5 pages.

(56) References Cited

OTHER PUBLICATIONS

CA Exam report CA Application No. 2955640 Applicant: Preemadonna Inc., dated Apr. 30, 2019, 4 pages.

* cited by examiner

1. User launches app. App instructs user to swipe finger to line.

2. User touches screen and moves finger toward center line.

SYSTEMS AND APPARATUSES TO APPLY A MATERIAL TO A NAIL

CLAIM OF PRIORITY

This application is a Continuation application of U.S. application Ser. No. 15/599,503 filed May 19, 2017 and entitled 'SYSTEMS, METHODS, AND APPARATUSES FOR DECORATING NAILS,' which is a Continuation application of U.S. application Ser. No. 14/468,239, filed Aug. 25, 2014 and entitled 'NAIL DECORATING APPARATUS,' issued as U.S. Pat. No. 9,687,059 on Jun. 27, 2017, which claims the benefit of U.S. Provisional Application No. 61/869,611, filed Aug. 23, 2013 and entitled "NAIL PAINTING ROBOT," and U.S. Provisional Application No. 62/028,233, filed Jul. 23, 2014 and entitled "SMARTPHONE NAIL PAINTING ROBOT," the contents of which are incorporated by reference in its entirety.

TECHNICAL FIELD

The present invention is directed to an apparatus for, and methods of, applying a nail covering material to human nails

SUMMARY

A method of decorating a human nail comprising the steps of: (i) placing a user's finger in a positioning aid for orienting the user's finger below a photographic lens of a camera; (ii) capturing and recording an image of a user's finger with the camera on a portable electronic device, the image including a portion the user's nail; (iii) based on the image of the user's finger, determining at least one measurement selected from the group consisting of (a) the width of the user's finger, (b) the width of the user's nail and (c) the length of the user's nail; (iv) calculating a print area based on the at least one measurement in step (iii); (v) communicating the print area to the ink jet printer assembly; (vi) placing the user's finger in contact with the touch screen of the portable electronic device; (vii) detecting that the user's finger is within the print area; and (viii) applying a nail-coating material to the print area.

DETAILED DESCRIPTION

Figure 1:
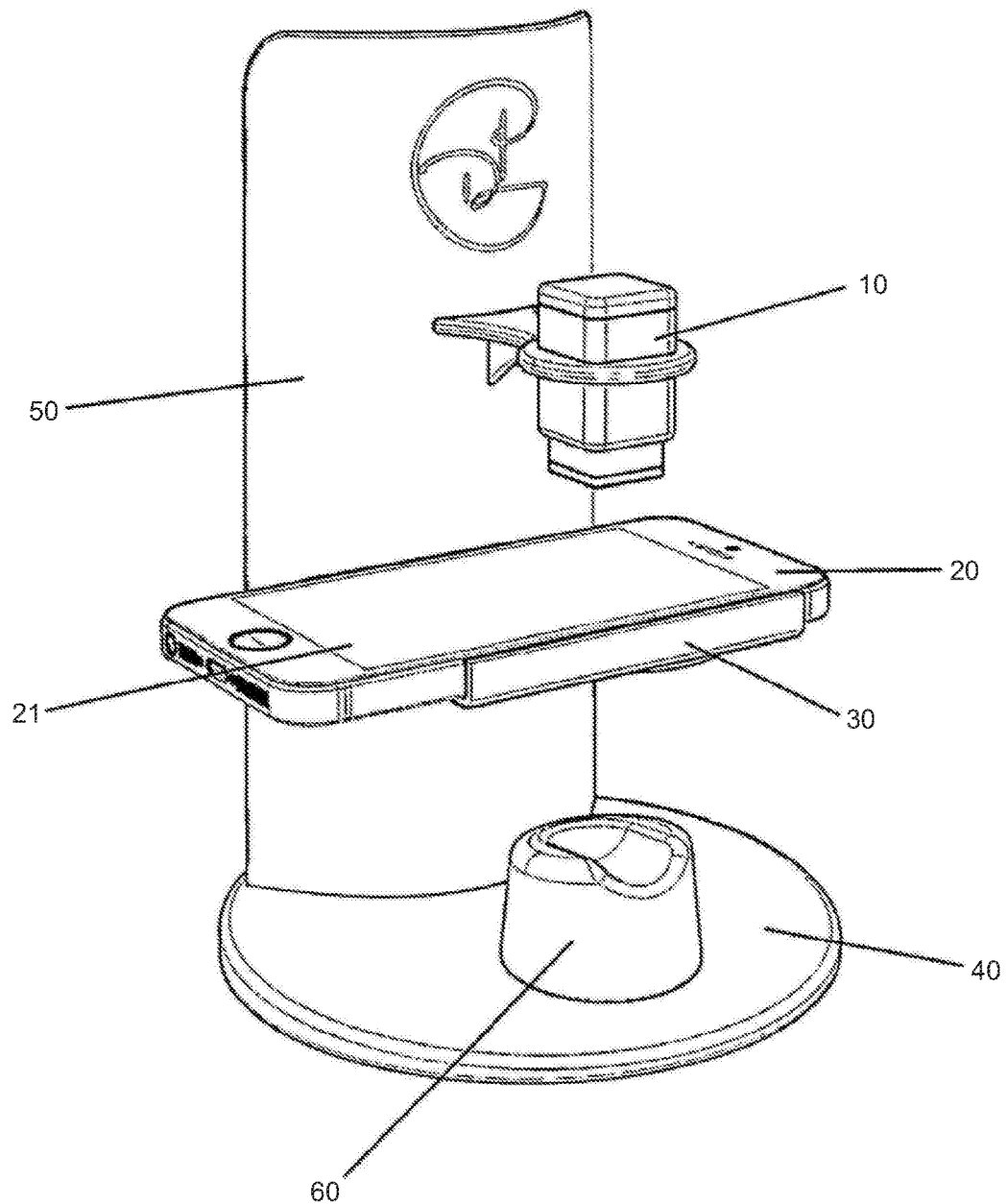
FIG. 1 shows an embodiment of the nail decorating apparatus of the present invention comprising an ink jet printer assembly [10], a portable electronic device [20] having a touch-sensitive display [21] and an imaging system having a camera with at least one photographic lens, a cradle for the portable electronic device [30], a base stage [40], a vertical stand member [50], and a positioning aid [60] for orienting a user's finger to a predetermined location below the photographic lens.
Figure 2:
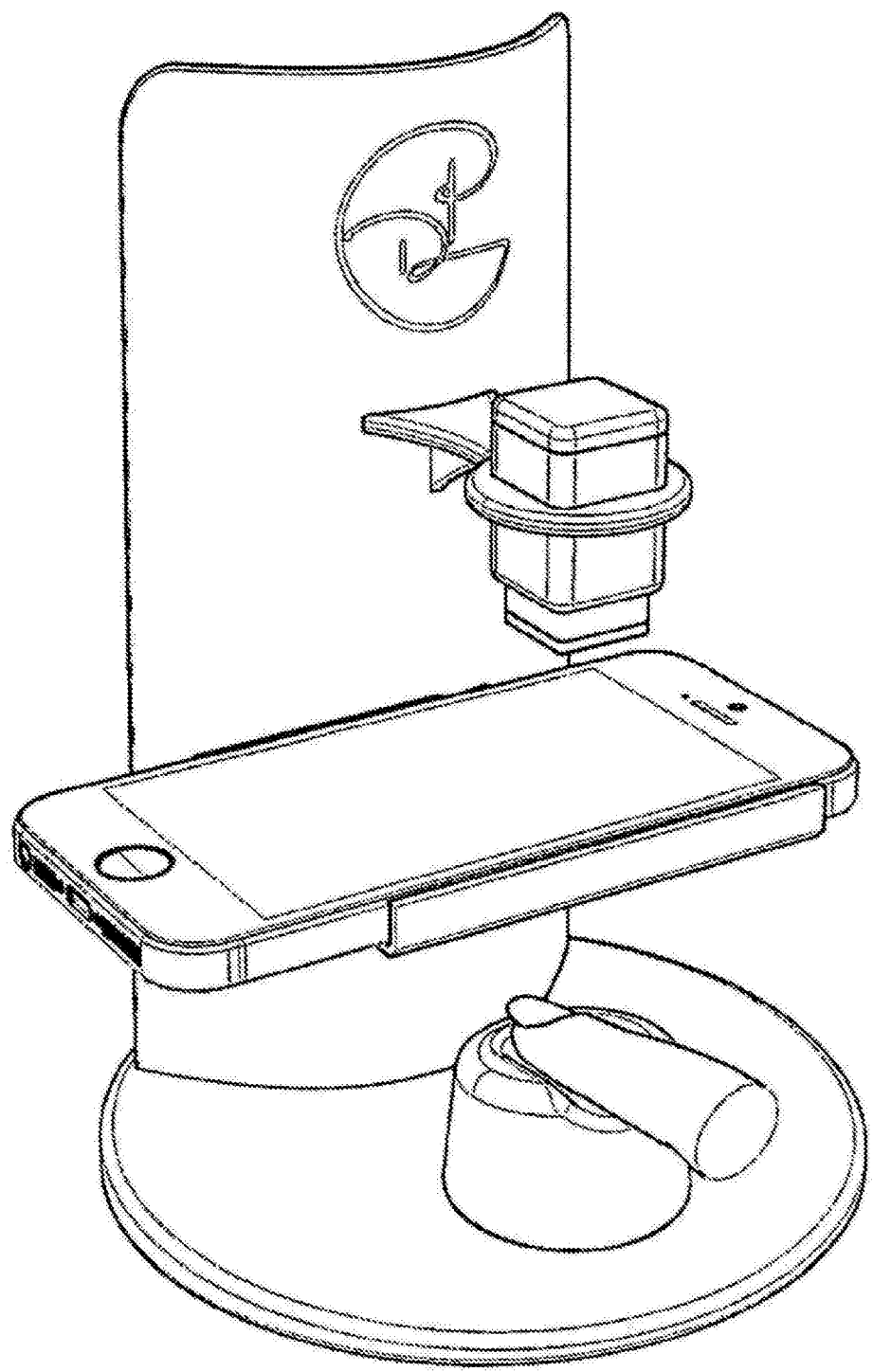
FIG. 2 shows a user's finger on a single-finger positioning aid.
Figure 3:
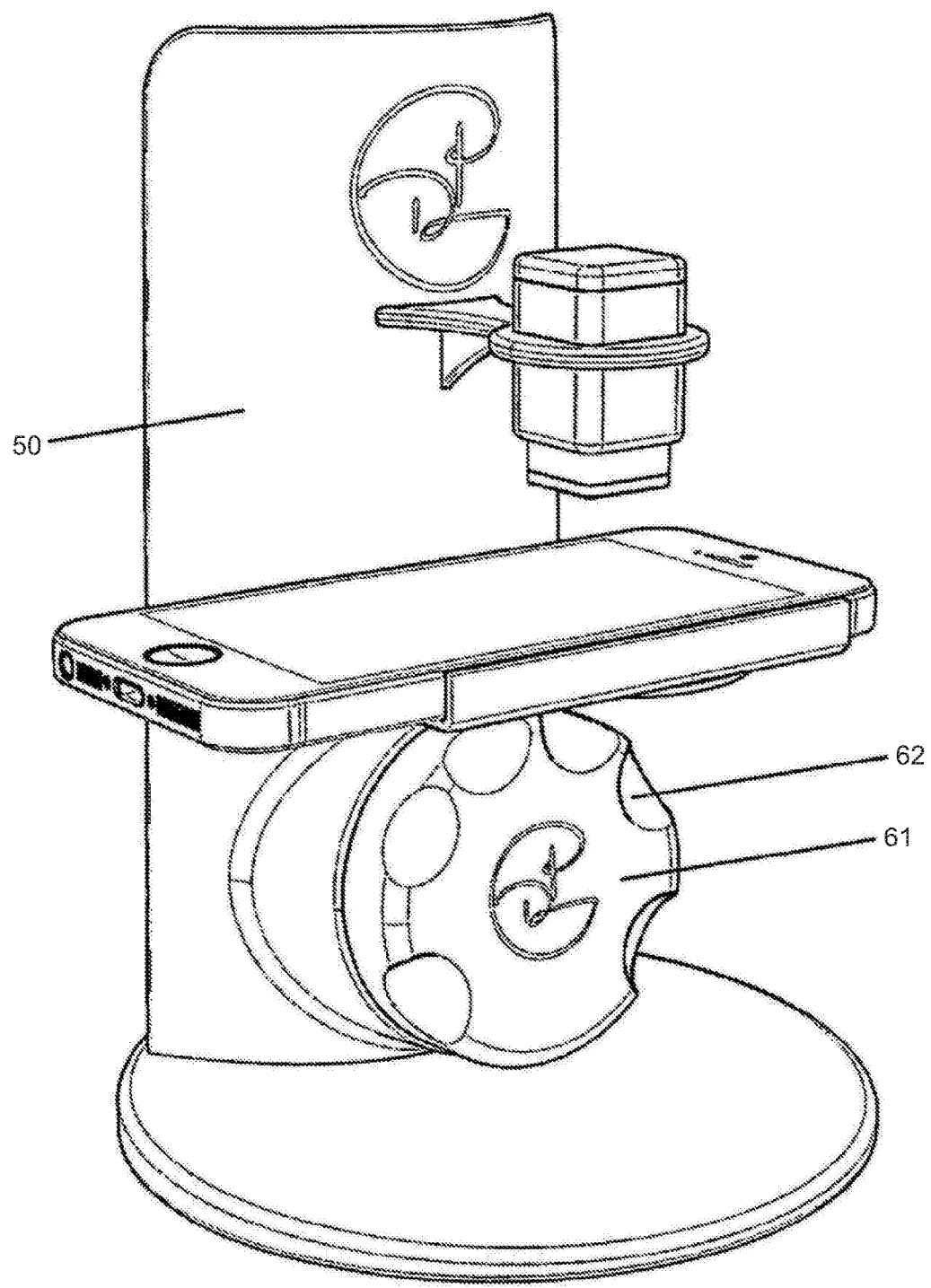
FIG. 3 shows an embodiment of the nail decorating apparatus of the present invention where a positioning aid [61] is attached to a vertical stand member [50]. The positioning aid is aligned vertically, parallel to the vertical stand member, and perpendicular to the cradle. The positioning aid has five indentations/groves [62] that are configured to hold each of the five fingers on a user's hand in a predetermined location below a photographic lens on a portable electronic device.
Figure 4:
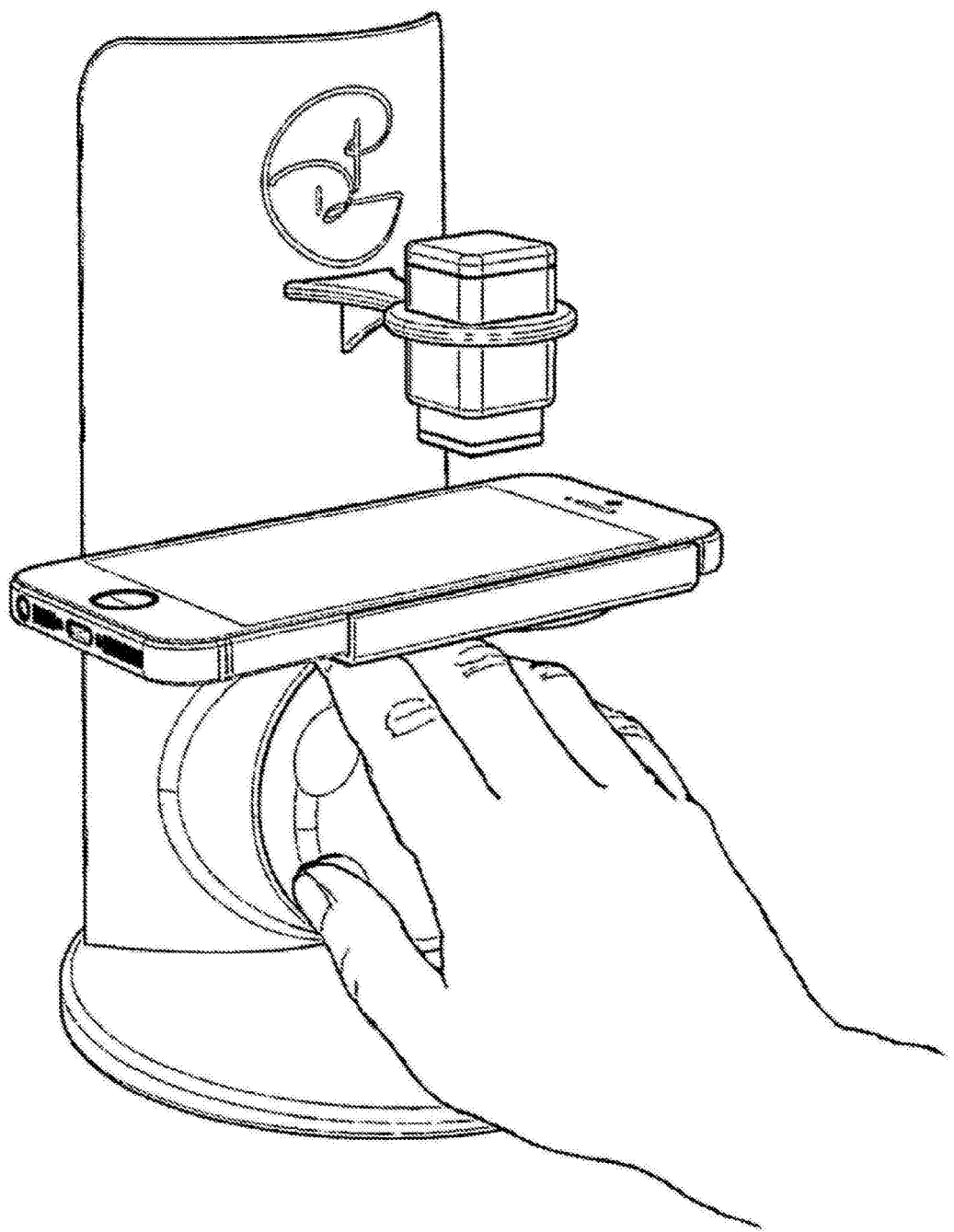
FIG. 4 shows a user's hand oriented in a first position on the positioning aid described in FIG. 3.
Figure 5:
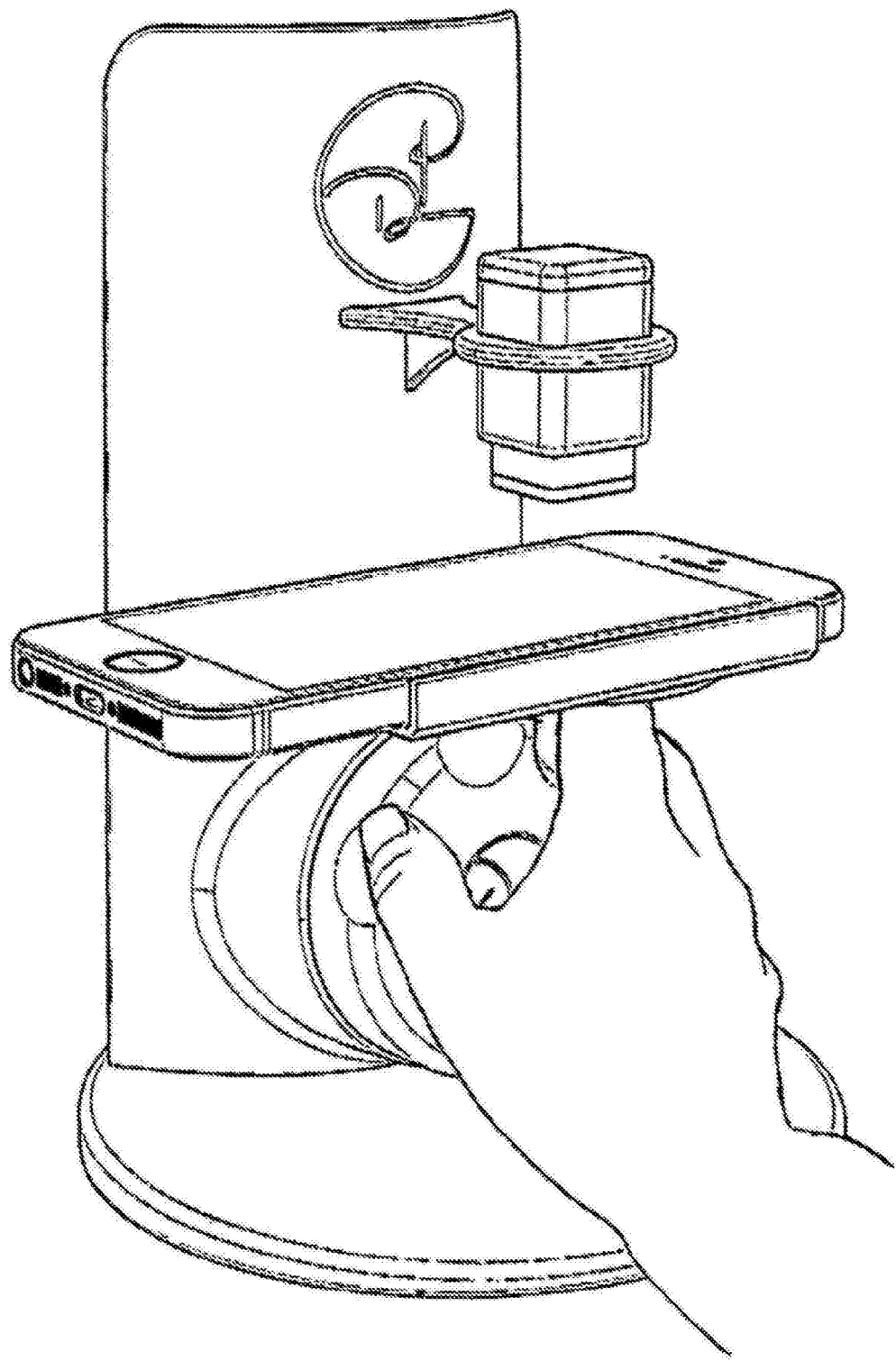
FIG. 5 shows a user's hand oriented in a second position on the positioning aid described in FIG. 3.
Figure 6:
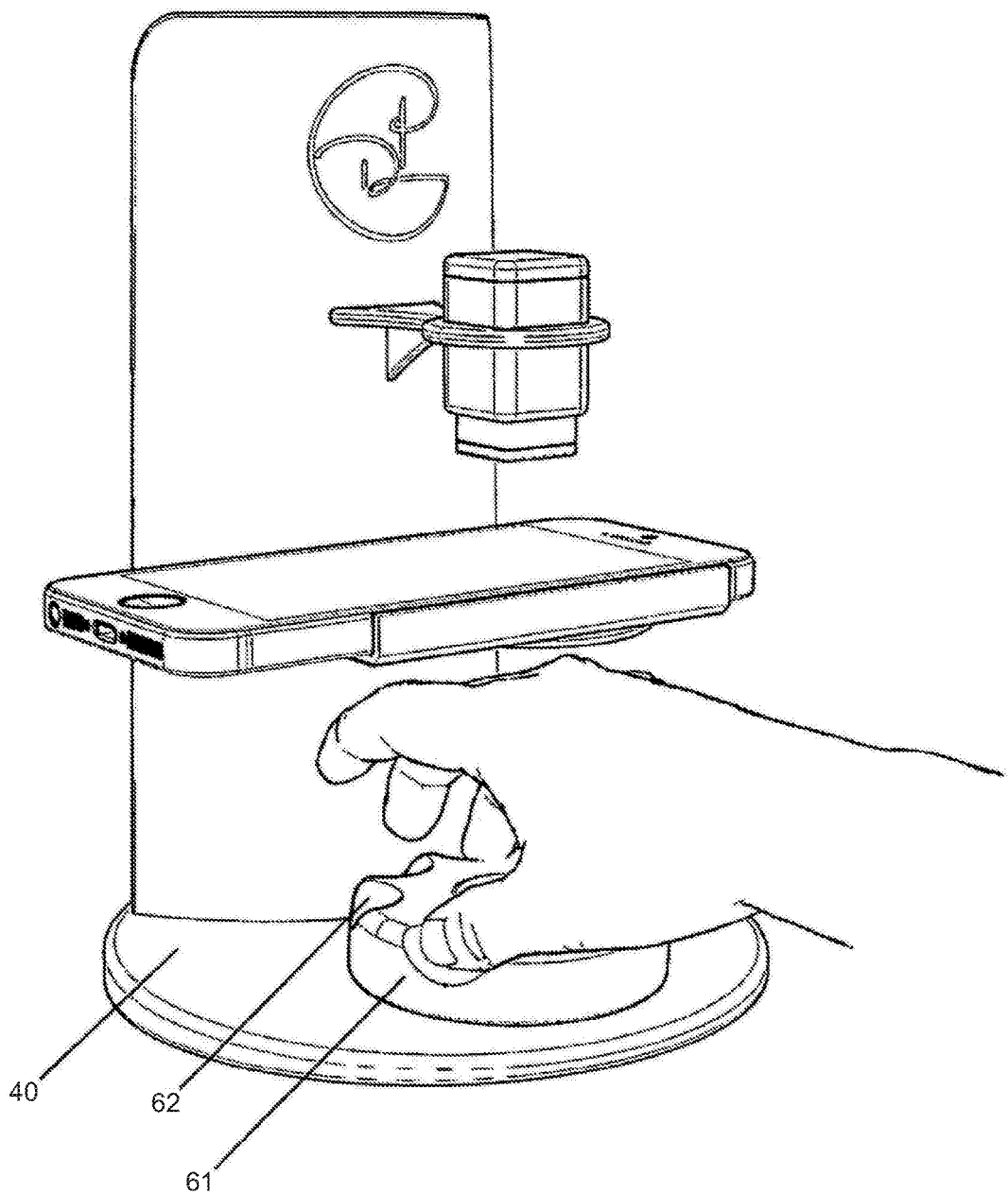
FIG. 6 shows an embodiment of the nail decorating apparatus of the present invention where a positioning aid [61] is attached to the base stage [40]. The positioning aid is aligned horizontally on the base stage, and is below and parallel to the cradle. The positioning aid has five indentations/groves [62] that are configured to hold each of the five fingers on a user's hand in a predetermined location below the photographic lens on a portable electronic device.
Figure 7:
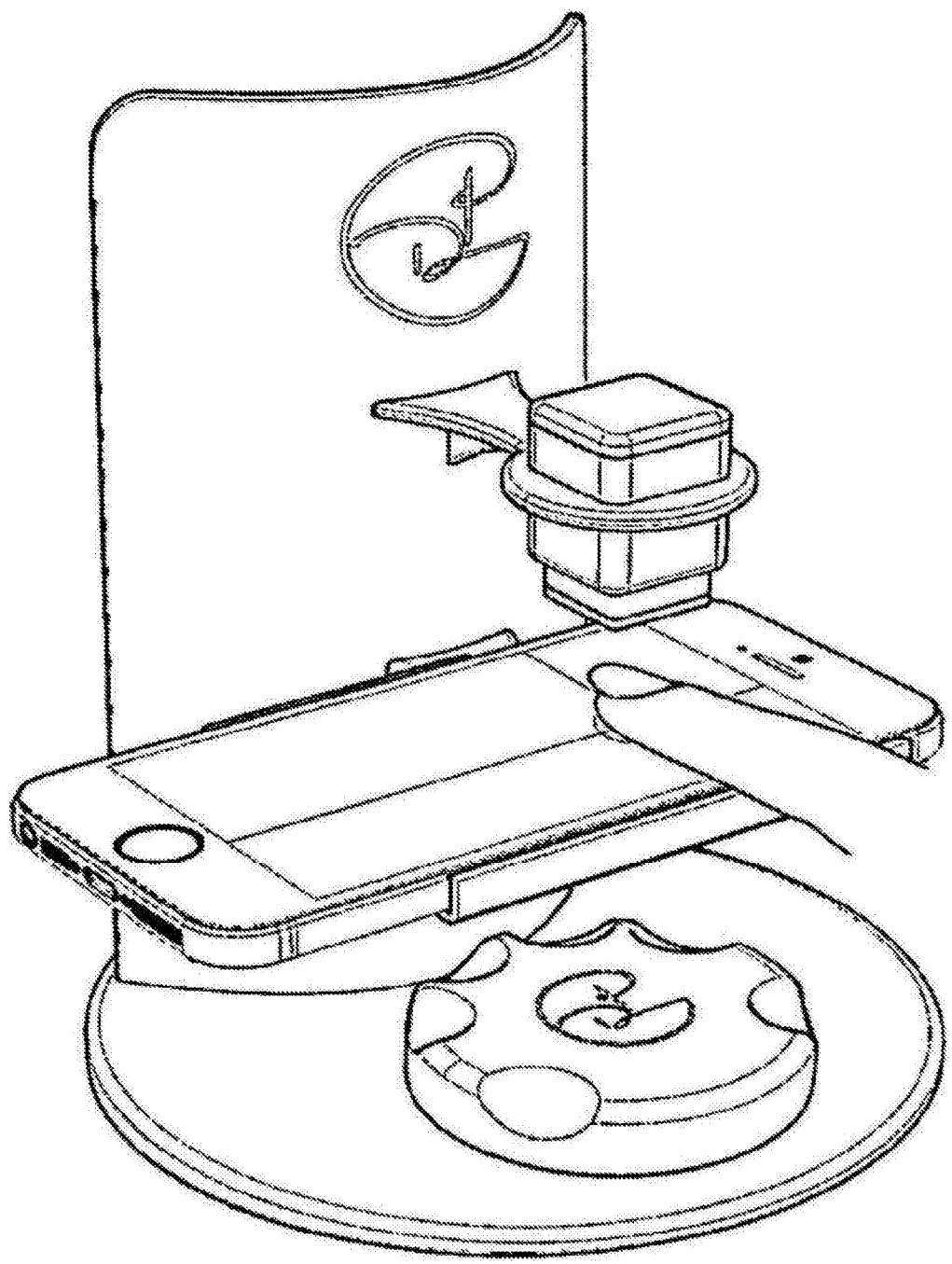
FIG. 7 shows the positional aid described in FIG. 6, and a user's finger in contact with the touch screen aligned with a crosshair projected downward from the ink jet printer assembly.
Figure 8A:
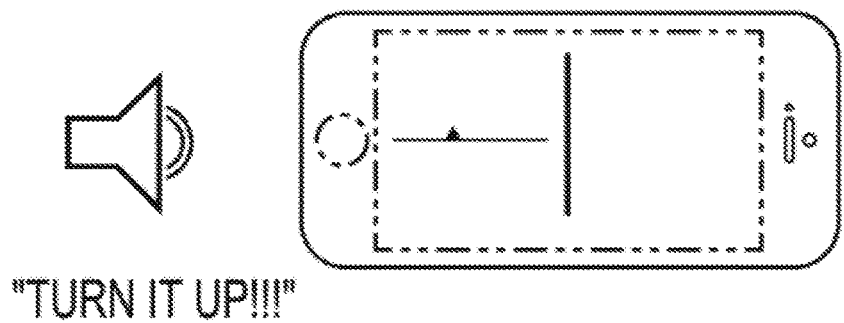
FIG. 8 illustrates audio/visual cues on the touch screen guiding a user. (a) shows the user launching an app that is installed on the portable electronic device. The App provides an audio/visual cue to the user, for example "Turn it up!", and then further instructs the user to "swipe" her finger to a line displayed on the touchscreen. (b) illustrates a user contacting the touch screen of the portable electronic device and moving a finger to a pre-defined location (center line) on the touch screen, thereby starting application of nail-covering material to the nail. (c) After the finger is placed on the pre-defined location, the App provides a second audio/visual cue, for example by displaying the text "Let's Paint".
Figure 8B:
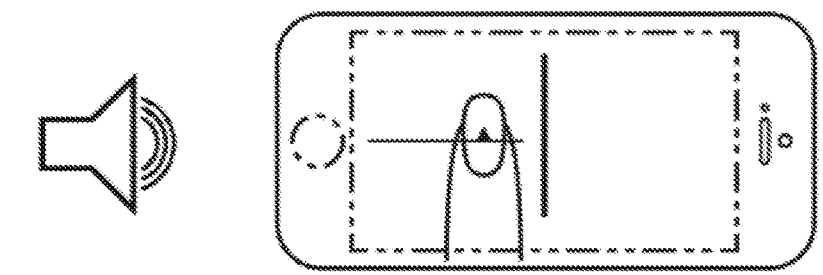
Figure 8C:
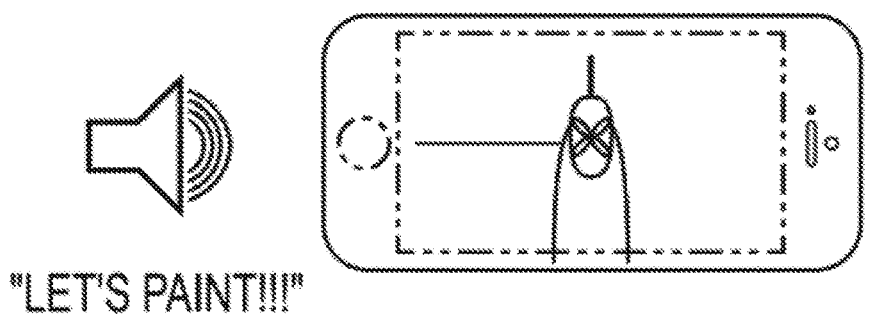
Figure 9:
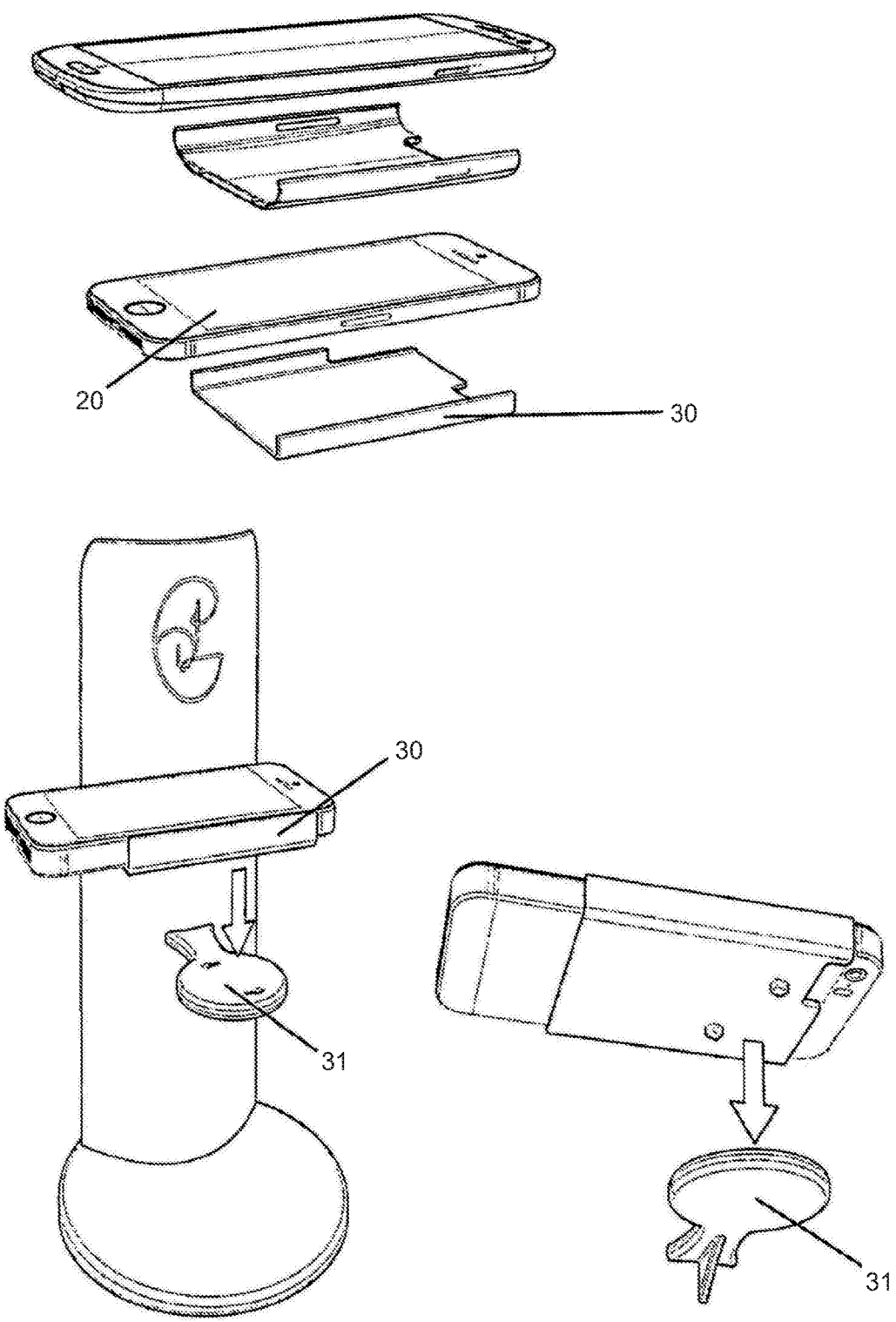
FIG. 9 shows an exploded view of the portable electronic device [20], a cradle [30] for the portable electronic device, and a platform [31] attached to the vertical stand member to which the cradle is attached.
Figure 10:
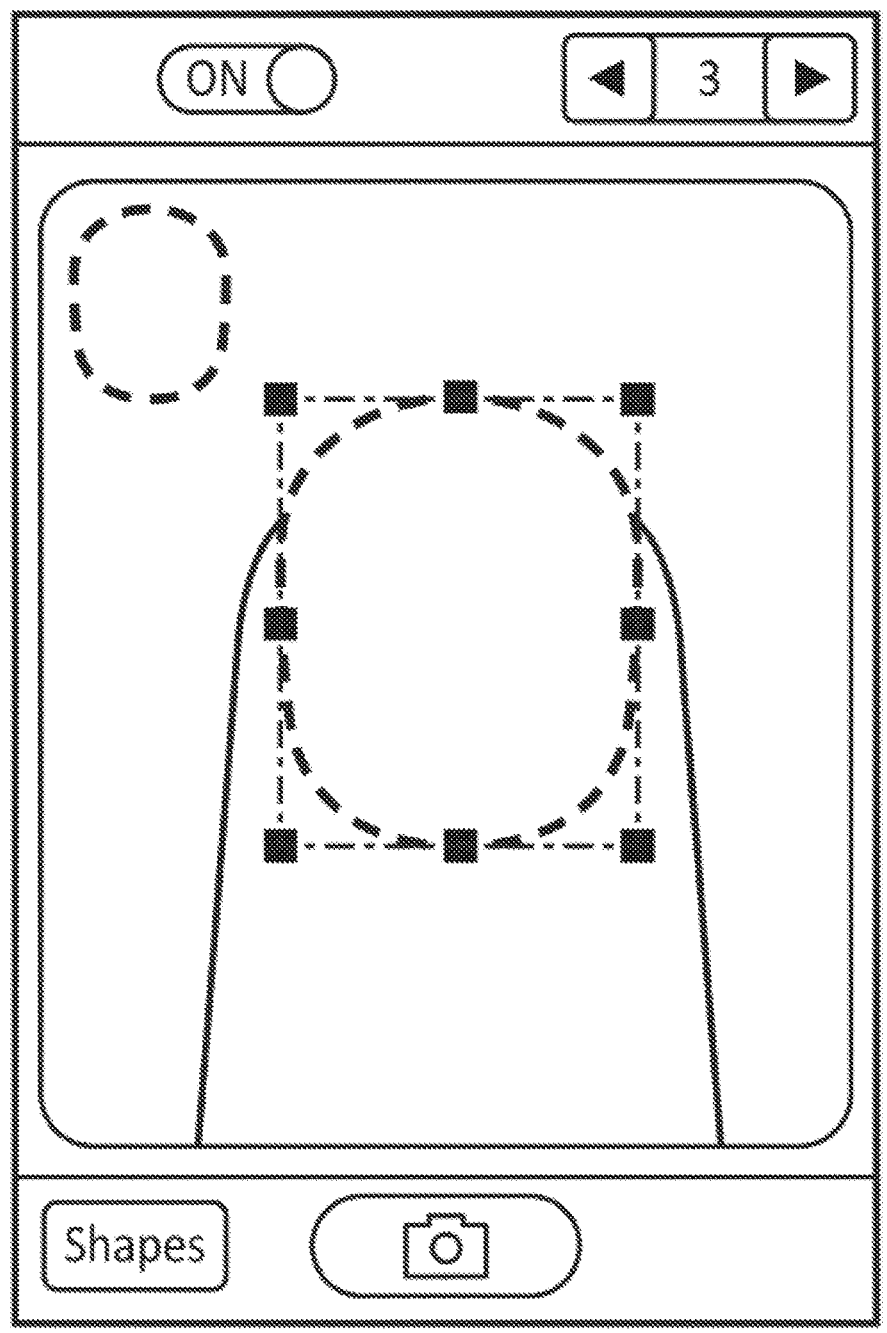
FIG. 10 shows an image of a user's finger and nail with the nail perimeter outlined on the app.
Figure 11A:
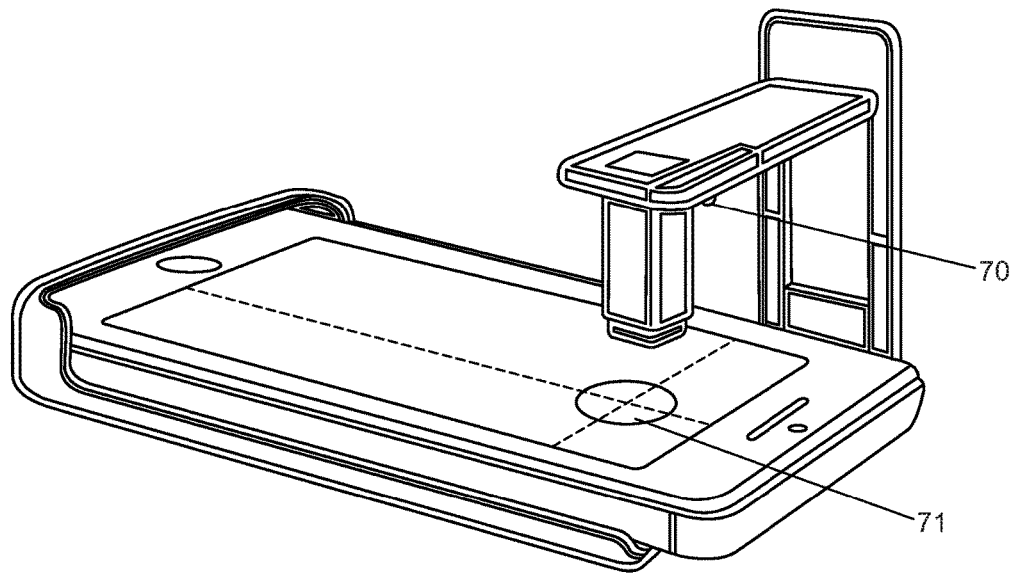
FIG. 11 shows a light source [70] projecting a crosshair [71] downward on to the touch screen.
Figure 11B:
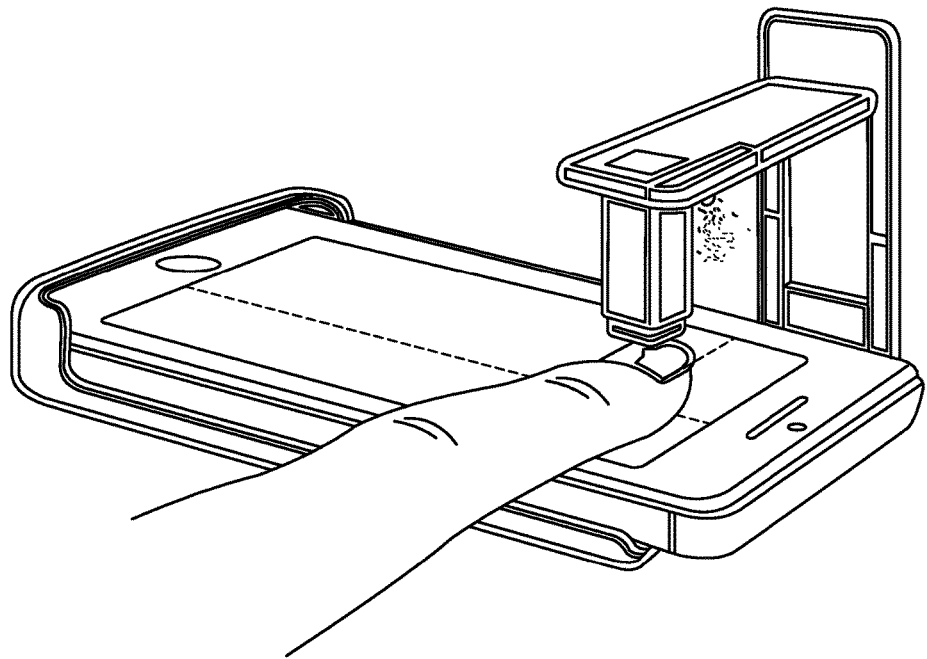
Figure 12A:
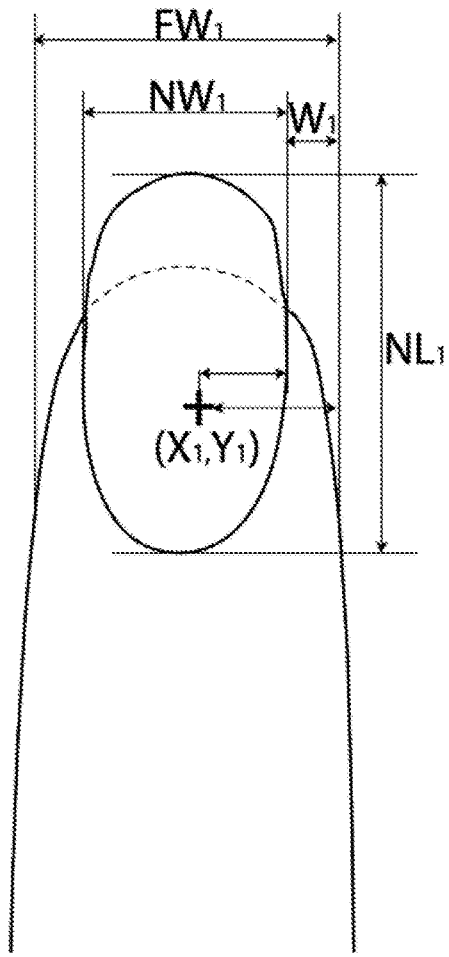
FIG. 12 shows measurements of nail length [NL], nail width [NW] and finger width [FW].
Figure 12B:
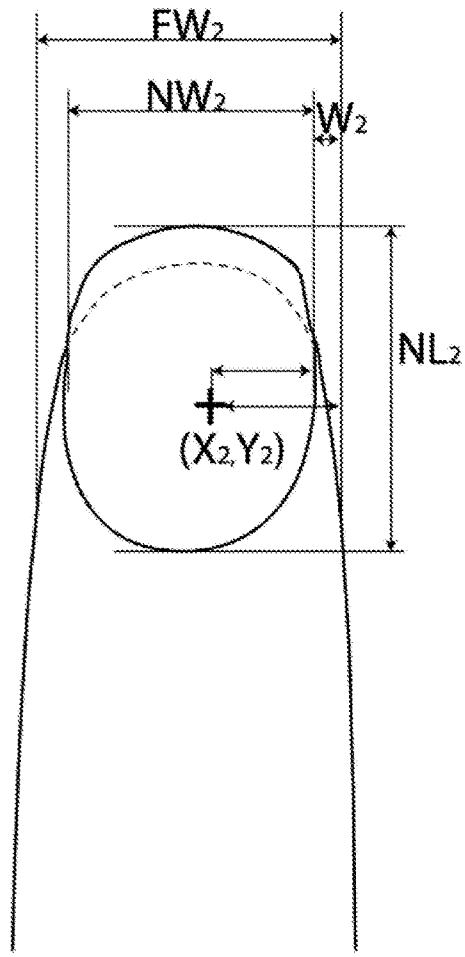
Figure 13:
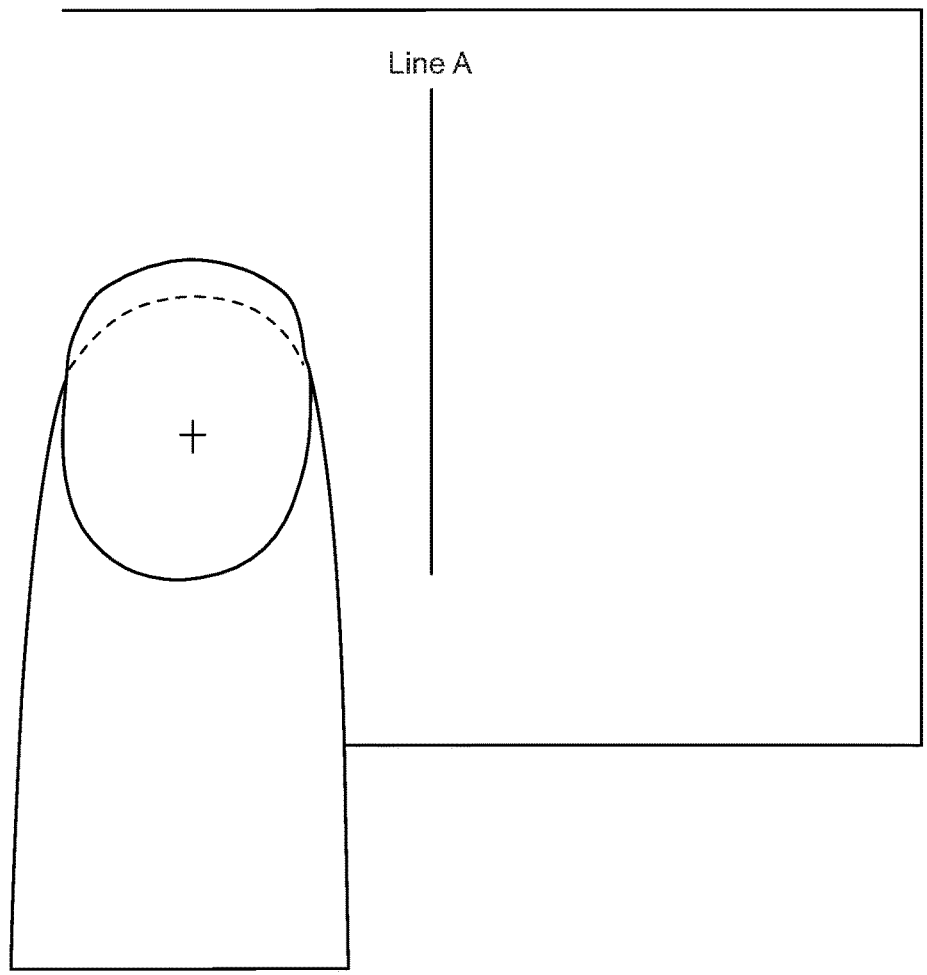
FIG. 13 illustrates a fingernail with a crosshatch on a touch screen displaying a visual cue—a line on to which the user moves/positions the finger to start application of the nail-decorating coating by the ink jet printer assembly.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control. The methods of the present invention for applying a nail-covering material to human nails are, in certain preferred embodiments, performed using a portable electronic device having two essential components—a touch-sensitive display with a graphical user interface and an imaging system.

The term "human nails" as used in the present application is to be understood to mean the keratogenous membrane that provides a protective plate at the end of the fingers and toes of a human being. Sometimes "human nails" are referred to as "nails" and, in preferred embodiments, "fingernails".

As used in the present application, the term "nail-covering material" is to be understood to mean nail polish/lacquer as well as ink, paint, or similar materials that impart color to the surface of human nails. A touch screen is an electronic visual display that a user can control, including by the portable electronic device has a screen with a touch-sensitive surface that accepts user input by haptic and/or tactile contact. More particularly, contact, movement, or a break in contact is detected using any of a plurality of touch sensitive technologies known to the skilled artisan, including, but not limited to, capacitive, resistive, infrared, and surface acoustic wave technologies, as well as proximity sensor arrays. The touch screen on the portable electronic device provides visual output to the user via a liquid crystal display, light emitting polymer display, or other display technology known in the art.

In one preferred embodiment, the portable electronic device used in the methods of the present invention has a capacitive touch screen comprised of an insulator (e.g., glass) and a transparent conductor (e.g., indium tin oxide). In this embodiment, a fingertip acts as a conductive material; touching the surface of the screen results in a distortion of the screen's electrostatic field, creating a measurable change in capacitance. Different technologies known in the art may be used to determine the location of a fingertip on the capacitive touch screen. This location is then sent to a controller for processing.

In addition to a touch screen, the portable electronic device used in the methods of the present invention has a touch screen controller, one or more processors, memory (e.g., one or more magnetic disk storage devices, flash memory devices, or other non-volatile solid state memory devices), software (also known as apps), and a means for powering the components of the device.

The portable electronic device used in the methods of the present invention also has modular sets of instructions that are stored in the memory for execution by one or more processors for detecting contact with the touch-sensitive screen, displaying graphics, providing a graphical user interface, processing images, determining the perimeter of a nail, calculating a print area (as defined below), storing a plurality of nail art (as defined below) and communicating with an ink jet printer assembly.

Contact, movement or a break in contact with the touch screen is detected and processed by a contact module that includes software components for determining that (a) contact has occurred, (b) contact is being maintained, (c) movement of the point of contact has occurred, and if so, tracking that movement, and (d) contact has been broken (i.e., contact has ceased). Determining movement of the point of contact may include determining changes in the magnitude and/or direction of the point of contact. The contact module converts information relating to the point of contact into electrical signals that are processed and displayed on the touch screen as well as communicated to the ink jet printer assembly In preferred embodiments, the portable electronic device has a wireless communication function that provides a means for communicating with an ink jet print assembly (or other communicatively attached (e.g., via an electrical connector) to a controller that in turn communicates with the ink jet printer assembly.

The imaging system that is an essential part of the portable electronic device is capable one photographic lens. In preferred embodiments, the camera has a plurality of photographic lens arranged along a common axis. In an especially preferred embodiment, the portable electronic device has at least one speaker for providing one or more audio cues to the user.

The portable electronic device is received and held in a cradle positioned below an upper arm having an ink jet printer assembly. By "received" is meant "slid" or "snapped into" or otherwise "attached to". The cradle can be affixed directly to the nail decorating apparatus of the present invention or to a platform on the nail decorating apparatus.

A vertical stand member connects the cradle and the upper arm/ink jet printer assembly. In a preferred embodiment, the cradle is positioned below an upper arm having an ink jet printer assembly and above a base stage that is configured at a fixed distance from the camera to provide optimal and repeatable positioning of a fingernail during image acquisition. In this embodiment, a vertical stand member connects the cradle, the upper arm and the base stage.

The base stage can have, and preferably does have, a positioning aid for orienting at least one finger (and its fingernail) to a predetermined location below the photographic lens.

In certain embodiments, the positioning aid is attached directly to the nail decorating apparatus of the present invention. In other embodiments, the positioning aid is separate from the device and is placed below the camera/cradle. In a first embodiment, the positioning aid is configured to hold an individual finger in a predetermined location below the photographic lens.

In a second embodiment, the positioning aid is configured to hold each of the five fingers on a user's hand in a predetermined location below the photographic lens. In one preferred aspect of the second embodiment, the positioning aid is a dial that can be turned/twisted by a user to five different positions. The dial can be positioned horizontally or vertically in relation to the cradle/camera. The camera can, and preferably does have, at least one flash unit for illuminating the nail.

In a preferred embodiment, the cradle is above a base stage that has one or more light sources, apart from the flash unit on the camera. The ink jet printer assembly used in the nail decorating apparatus of the present invention is a micro-electronic device comprised of a printhead having a plurality of ink nozzles and integrated circuits that route signals to the ink nozzles, controlling the formation and release of ink droplets. At least one ink color—and preferably, a plurality of ink colors—is/are stored in one or more separate ink reservoir(s) within the ink jet printer assembly.

Ink nozzles are connected to ink color reservoir(s) and are configured in a series of chambers that produce ink droplets "on demand" by thermal or piezoelectric means known in the art. In general, a pulse of electric current passes through a heating element within each chamber, causing ink in the chamber to rapidly vaporize and form a bubble.

The resulting increase in pressure within the chamber propels tiny ink droplets through the nozzle onto the nail. In preferred embodiments, the ink jet printer assembly is comprised of inks having a plurality of colors. As used in the present invention, the term "color" is to be understood to mean cyan, magenta, yellow, black, and white and combinations and shades thereof. In the first step of the methods of the present invention—image acquisition—a user places a portable electronic device in a cradle.

In a preferred embodiment, the cradle/camera is above the base stage of the nail decorating device. In this preferred embodiment, the user places at least one finger on the base stage, and captures/records at least image (i.e., takes at least one photograph) of a fingernail using the camera on the portable electronic device. In certain embodiments, the user may take a plurality of images of the fingernail—either as a "burst" of individual frames or as a video clip. In one embodiment, the cradle has a device for projecting a crosshair, two lines crossing at right angles, or another geometrical shape (e.g., circle, triangle, square) downward onto the base stage.

In one aspect of this embodiment, the user orients the nail such that the crosshair is positioned, preferably centered, on top of the nail. In another aspect of this embodiment, the user orients the nail such that a geometrical shape is positioned on top of the nail and takes at least one photograph of a fingernail using the camera on the portable electronic device.

In another embodiment, the base stage has a positioning aid that is configured to hold an individual finger in a predetermined location below the photographic lens. The user places a finger in the positioning aid and takes at least one photograph of the nail of that finger using the camera on the portable electronic device.

In yet another embodiment, the base stage has a positioning aid that is configured to simultaneously hold each of the five fingers on a user's hand in a predetermined location below to the photographic lens. The user places a hand in the positioning aid and takes at least one photograph of a fingernail using the camera on the portable electronic device.

The positioning aid for simultaneously holding each of the five fingers on a user's hand may be a dial that is positioned vertically or horizontally below the cradle. In the horizontal embodiment, the positioning aid is preferably attached to the base stage.

In the vertical embodiment, the positioning aid is preferably attached to the vertical stand member. The user turns/twists or otherwise orients the dial to one of five different positions and takes at least one photograph of a nail to be decorated using the camera on the portable electronic device.

In a second step of the methods of the present invention, at least one image of a nail from the first step is analyzed using software (an app) that is installed on the portable electronic device. The user runs the app, which overlays an X,Y grid over the image of the nail to be decorated, and calculates the following values: finger width (FW); nail width (NW); nail length (NL). The app applies an edge detection algorithm to FW, NW and NL to determine (a) an outline (perimeter) of the finger and/or (b) an outline (perimeter) of the area on the nail on the finger from (a) to be decorated. The surface of the nail to be decorated, which can be the entire nail or a portion of the nail, is referred to in the present application as the "print area".

In the third step of the methods of the present invention—application of a nail covering material to a nail that has been imaged and for which a print area has been determined—the user performs a predefined gesture, and the touch-sensitive screen detects contact between a predefined application area on the touch screen display and the fingertip (the fleshy portion of the distal phalanx of a finger).

As used in the present application, the term "gesture" is to be understood to mean an initial point of contact between the fingertip and the touch screen, movement of the fingertip from the initial point of contact (e.g., along a predefined path) while maintaining continuous contact with the touch screen, and a breaking of contact between the fingertip and the touch screen (to complete the gesture).

In one embodiment, an outline of the perimeter of the user's finger is displayed on the touch screen. The user places the finger within the outlined area. The app detects the finger, or portion of the finger, as being within the outlined area and sends instructions to the ink jet printer assembly to apply the nail-coating material to the print area. In one embodiment, the arm has a device for projecting a crosshair, two lines crossing at right angles, or other geometrical shape (e.g., circle, triangle, square) downward onto the touch screen. In one aspect of this embodiment, the user orients the nail such that the crosshair is positioned, preferably centered, on top of the nail.

In another aspect of this embodiment, the user orients the nail such that an outline of the perimeter of the fingernail is positioned on top of the nail. The user then takes at least one photograph of a fingernail using the camera on the portable electronic device. In certain embodiments, the ink jet print head is configured with a number of nozzles such that the user does not need to move the finger in order for the nail-coating material to be applied to cover or coat the print area.

In other embodiments, the ink jet print head is configured with a number of nozzles such that in order for the nail-coating material to be applied to the entire print area, the finger/nail must be moved from a starting position to a completion position.

In accordance with this embodiment, the user may move a graphical user interface (GUI) object from a predefined initiation point on the touch-sensitive screen to a predefined completion point on the touch-sensitive screen. In a preferred, but non-limiting example, the user "slides" an indicator along a line segment.

In one aspect of this embodiment, the touch-sensitive screen displays a plurality of predefined, sequential points, including an initiation point, at least one intermediate point, and a completion point. The user moves the GUI object from point to point. In embodiments in which nail covering is applied to a fingernail at a plurality of predefined, sequential points, the user completes a series of gestures, each for a designated time interval. The touch screen may, and in preferred embodiments, does display visual cues to guide the user to maintain contact with each of the predefined, sequential points for a designated time interval.

In place of, or in addition to one or more visual cues, in certain embodiments the user may be provided with one or more audio cues to maintain contact with the touch screen for a designated time interval. The audio cue(s) are generated via at least one speaker that is preferably a part of the portable electronic device. In the above embodiments, the nail decorating apparatus begins in a "ready" state.

Upon detecting contact between the fingertip and the touch-sensitive display in the predefined application area (e.g., the outline of the finger nail), the nail decorating apparatus transitions to an "application" state. If contact between the fingertip and the touch-sensitive display in the predefined application area is not detected, a signal is sent to the ink jet print assembly to stop printing until such time as contact is restored between the fingertip and the touch-sensitive display in the predefined application area.

In other embodiments, one or more lines are displayed on the touch screen below the intended print area. The user places a finger on top of one or more lines. The touch screen detects the finger and communicates the position of the finger to the app. As needed, the app provides feedback (visual and/or audio cues) to the user to reposition the finger on the touch screen until the nail is oriented in the desired position (i.e., with respect to the one or more lines).

In other embodiments within the scope of the present invention, the portable electronic device having both a touch-sensitive display and an imaging system may be replaced with one or both of a separate touch-sensitive pad (i.e., touch screen) and/or a separate imaging system having a camera with at least one photographic lens. In one such embodiment, the touch screen and imaging system are connected via a main controller that communicates with an ink/paint controller that communicates with an ink/paint dispenser.

In preferred embodiments, methods of the present invention include a further step whereby a user selects nail art. By "nail art" is meant a color, pattern, shape or combination thereof. Non-limiting examples of nail art include images stored in a library on the app or imported into the app by the user from a different source file. The different source file can, for example, be photographs that are separately stored on the portable electronic device.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. An apparatus to apply a material to a nail, comprising:
   a receiving unit adapted to hold an external device;
   wherein, the receiving unit comprises a cradle or a receptor which receives and holds the external device therein;
   a vertical stand member;
   an applicator unit to apply the material to the nail coupled to the vertical stand member;
   a position aiding unit operably coupled to the applicator unit;
   wherein, the position aiding unit is removable;
   wherein the receiving unit is disposed on a side of the vertical stand member above the position aiding unit;
   wherein, in operation, the position aiding unit facilitates positioning of the nail relative to the applicator unit;
   wherein, in operation, the applicator unit applies the material to the nail;
   wherein the external device comprises:
   a processing unit:
   a memory unit coupled to the processing unit, the memory unit having stored thereon instructions which when executed by the processing unit, cause the processing unit to;
   perform image processing techniques on the image of the nail;
   provide audio or visual cues in relation to operating the apparatus.

2. The apparatus of claim 1, wherein, the external device includes a portable electronic device.

3. The apparatus of claim 1, further comprising, an imaging unit to capture an image of the nail; wherein, the imaging unit is coupled to the external device.

4. The apparatus of claim 3, wherein the imaging unit comprises a camera having one or more photographic lens.

5. The apparatus of claim 1, further comprising, an imaging unit; wherein, the imaging unit is comprised of a camera of the external device; wherein, the external device includes a mobile phone.

6. The apparatus of claim 1, further comprising,
   an imaging unit to capture an image of the nail;
   wherein, the external device includes a mobile phone having a back-facing camera;
   further wherein, the imaging unit is comprised of the back-facing camera of the mobile phone.

7. The apparatus of claim 1, wherein, the external device includes a mobile phone; wherein the mobile phone, when held in the receiving unit, is disposed such that a rear facing camera of the mobile phone is operable to image the nail.

8. The apparatus of claim 1, wherein, the external device includes a mobile phone; wherein the mobile phone, when held in the receiving unit, is disposed such that a rear camera of the mobile phone is facing the position aiding unit.

9. The apparatus of claim 1, wherein the position aiding unit is configured to position the nail at a predetermined location or location range relative to the applicator unit.

10. The apparatus of claim 1, wherein:
    the applicator unit includes an ink jet printer assembly communicatively coupled to the external device via a controller;
    wherein, in operation, the ink jet printer assembly receives instructions wirelessly from the controller.

11. The apparatus of claim 1, further comprising:
    a communications unit able to communicate wirelessly with the external device;
    wherein the communications unit is coupled to the applicator unit;
    wherein, in operation, the applicator unit receives instructions wirelessly from the external device via the communications unit to decorate the nail.

12. The apparatus of claim 1,
    wherein, the image processing techniques uses one or more of: a finger width of a finger on which the nail is formed, a nail width of the nail and a nail length of the nail.

13. The apparatus of claim 1, further comprising, an imaging unit to capture an image of the nail; wherein, the imaging unit is physically embedded in the apparatus.

14. The apparatus of claim 1, wherein the memory unit having further stored thereon instructions which when executed by the processing unit, cause the external device to:
    detect contact with a touch-sensitive screen on the external device;
    display a graphical user interface on the touch-sensitive screen.

15. The apparatus of claim 1, wherein the memory unit having further stored thereon instructions which when executed by the processing unit, cause the processing unit to:
    enable user selection of nail art including images stored in the memory unit;
    wherein, the images of nail art are imported from a source file stored in the memory unit.

16. The apparatus of claim 1, wherein the applicator unit to apply the material for nail coating comprises ink; wherein, the applicator unit further comprises a micro-electrical mechanical assembly having:
    multiple ink nozzles;
    multiple ink reservoirs coupled to the ink nozzles;
    wherein, the multiple ink reservoirs store the ink to be applied to the nail;
    wherein, the ink nozzles produce ink droplets from the ink to paint the nail.

17. The apparatus of claim 1, further comprising,
    a motor mechanically integrated within or coupled to the applicator unit;
    wherein, in operation, the motor controls movement of the applicator unit to apply the material to decorate the nail.

* * * * *

UNITED STATES PATENT AND TRADEMARK OFFICE
CERTIFICATE OF CORRECTION

PATENT NO. : 10,477,937 B2  
APPLICATION NO. : 15/978238  
DATED : November 19, 2019  
INVENTOR(S) : Walia et al.

Page 1 of 1

It is certified that error appears in the above-identified patent and that said Letters Patent is hereby corrected as shown below:

On the Title Page

Left column, under '(72) Inventors', Line 1, after 'MENLO' insert -- PARK --.

Signed and Sealed this  
First Day of September, 2020

Andrei Iancu  
*Director of the United States Patent and Trademark Office*